United States Patent [19]
Schopper et al.

[11] Patent Number: 4,639,048
[45] Date of Patent: Jan. 27, 1987

[54] PROCESS AND APPARATUS FOR BRAKE PRESSURE CONTROL

[75] Inventors: Bernd Schopper, Hattersheim; Peter Tandler, Falkenstein, both of Fed. Rep. of Germany

[73] Assignee: Alfred Teves GmbH, Frankfurt am Main, Fed. Rep. of Germany

[21] Appl. No.: 734,582

[22] Filed: May 15, 1985

[30] Foreign Application Priority Data

May 15, 1984 [DE] Fed. Rep. of Germany ....... 3418041

[51] Int. Cl.$^4$ .............................................. B60T 8/18
[52] U.S. Cl. .................................. 303/22 R; 188/195; 303/56
[58] Field of Search .................. 303/22 R, 22 A, 6 C, 303/6 R, 56; 188/195, 349

[56] References Cited

U.S. PATENT DOCUMENTS 4,365,846 12/1982 Schopper et al. ..................... 303/56
4,427,239 1/1984 Reinartz et al. .................. 303/22 R

FOREIGN PATENT DOCUMENTS 2852370 6/1979 Fed. Rep. of Germany .... 303/22 R
2945027 6/1981 Fed. Rep. of Germany .
2456015 1/1981 France ................. 188/195
2459162 2/1981 France ................. 188/195
2099528 12/1982 United Kingdom ................ 188/195

Primary Examiner—Douglas C. Butler
Attorney, Agent, or Firm—James B. Raden; William J. Michals

[57] ABSTRACT

In the process, a spring device is pivotally connected to a transmission lever which is movable between two defined positions. The free end of the spring device is subjected to a defined load and is fixed stationary while the transmission lever is in the defined position corresponding to the closing position of the valve. Thereupon, the length of the prestressed spring device is fixed, which results after swiveling of the transmission lever into the other defined position. The effect of the spring tolerances on the precision of adjustment of the change-over point is excluded. The brake pressure control unit apparatus is provided with first and second stop elements fastened to the spring device with a removable spacing element inserted between the stop elements. The distance between the stop elements corresponds to a determined amount of spring preload fixed by the spacing element.

17 Claims, 2 Drawing Figures

PROCESS AND APPARATUS FOR BRAKE PRESSURE CONTROL

BACKGROUND OF THE INVENTION

This invention relates to a process for the preadjustment and adjustment of the change-over point of a brake pressure control unit of a pressure medium-actuatable vehicle brake unit. The brake pressure control unit is load-sensitively controlled by an adjustable spring device and is equipped with at least one valve with a control piston being pressure-sensitively slidable into closing position against the force of the spring device pivotable to a swiveling transmission lever. The transmission lever is moved between two defined positions, one of which being defined by the closing position of the valve. The present invention is more particularly, related to a brake pressure control unit for a pressure medium-actuatable vehicle brake unit, which brake pressure control unit is preadjustable and adjustable by means of the process and is load-sensitively controllable by an adjustable spring device and which is equipped with at least one valve with a control piston being pressure-sensitively slidable into closing position against the force of the spring device pivotable to a swiveling transmission lever.

In load-sensitive brake pressure control units, the change-over point, that is the pressure valve at which the pressure control initiates, is variable depending on the load of the vehicle. For this purpose, a swiveling transmission lever is arranged at the brake pressure control unit against which transmission lever the control piston of the valve of the brake pressure control unit is abutted and to which one end of a spring device is pivoted whose other end is pivoted to a vehicle element whose position relative to the brake pressure control unit is variable depending on the load. When the vehicle load varies, the force of the spring device acting upon the transmission lever will vary accordingly.

It is difficult and labor-intensive to mount the brake pressure control unit in the vehicle while under a defined load and to connect the spring device with the vehicle element and to adjust it in such a manner that the real change-over pressure coincides with the value desired in consideration of the brake pressure characteristics.

A process for the preadjustment and adjustment of the change-over point of a brake pressure control unit is known from the German patent application No. 2,945,027 by which a preadjustment is made prior to mounting of the brake pressure control unit in the vehicle and according to which the adjustment is made in the course of mounting of the brake pressure control unit in the vehicle. In the prior art process, first the spring pivotal point of the transmission lever of the unmounted brake pressure control unit is adjusted into a spatially exactly defined first position in that a first adjustment point provided at the casing of the brake pressure control unit is brought into a defined distance relative to a second adjustment point arranged at the transmission lever by means of a distance gauge. In this defined position, the value is adjusted in such a manner that the valve closing organ just comes to be in contact at the pertaining valve seat, that is, that it closes, which is ascertained by a flow measurement. Subsequently, during mounting of the brake pressure control unit in the definedly loaded vehicle, the spring pivotal point is brought into an exactly defined second position. In doing so, the distance between the two positions of the spring pivotal point is selected such that it exactly corresponds to the spring excursion by which the spring device requires to be extended to reach the closing position, in order to furnish the amount of spring force necessary to adjust the desired change-over point. This second defined position, too, is adjusted by means of a second distance gauge and is thus fixed. Upon adjustment and fixation of the second position, the spring device is suspended free of play and force at the transmission lever and at a vehicle element, and the fixation of the second position is cancelled. The application of this process for the preadjustment and adjustment of the change-over point is based on the assumption that a spring device which has to sustain stretching strains requires to be elongated by a defined spring excursion in order to bring to bear an exactly defined spring force, in other words, the adjustment of the predetermined spring force is effected by way of adjustment of the spring excursion determined on the basis of the theoretical spring parameters. It is a disadvantage in this context and inherent in this process that the strong deviations occurring in practice in the characteristic data of the individual springs cannot be taken account of. If and when precision springs with narrow tolerances are employed, this will result in an increase of the costs of the whole brake pressure control device. In addition, two different gauges are required to carry out the process. Since the change-over pressure and the load-sensitive variation of the center distance are generally determined by the constructional design, there result undesirably extended valve closing travels which may lead to an excessive wear of the slidable components.

It is an object of the present invention to create a specific process for the preadjustment and adjustment of the change-over point of a brake pressure control unit which is easy to carry out and in which the influence the spring tolerances bear on the precision of adjustment of the change-over point is excluded. A further object of the present invention is to create a brake pressure control unit of the kind mentioned in the beginning which is suited for the application of the inventive process and whose change-over point allows to be preadjusted in the manufacturers' works and adjusted in the event of mounting in the vehicle without cumbersome adjusting operations.

SUMMARY OF THE INVENTION

According to the invention, these objects are achieved in that upon pivoting of the spring device, a defined force is applied to the free end of the spring device, the free end of the spring device to which latter force is applied is fixed stationary with the transmission lever being in the defined position related to the closing position, the transmission lever is brought into the other defined position, and the length of the prestressed spring device so adjusted is fixed.

According to the invention, the forementioned object is, furthermore, achieved in that upon pivoting of the spring device, a defined force is applied to the free end of the spring device, the free end of the spring device to which latter force is applied is fixed stationary with the transmission lever being in the defined position related to the closing position, the transmission lever is brought into the other defined position, and the length of the prestressed spring device so adjusted is fixed, and in that in the course of mounting in the vehicle, the brake pressure control unit is fastened to a first vehicle element and the free end of the spring device pivoted to a second vehicle element which is movable with respect to the first vehicle element depending on the load, and in that after the adjustment of the freedom of play the fixation of the spring device is being cancelled.

In the process according to the present invention, the deviations from the determined spring parameters occurring in practice in springs of identical type are no longer of importance because not a spring excursion is being fixed but that amount of spring prestress instead which comes about due to the shift by the closing travel of the valve, starting from the spring force adjusted at the change-over point. That is to say, when the control piston of the mounted brake pressure control unit shifts by the closing travel, the desired spring force is obtained with high accuracy. Already with the manufacturers of the brake pressure control unit, the brake pressure control unit is provided with a spring which is selected in accordance with the vehicle design.

In an advantageous version of the process, in the event of adjustment of the first defined position of the transmission lever which corresponds to an open position of the valve, the bearing point for the swiveling motion of the transmission lever is shifted while the transmission lever is in abutment against the control piston. In this version, a structural member existing anyhow is utilized for the adjustment of the first defined position.

It is, furthermore, envisaged to conduct a measurement of the flow of pressure medium through the valve in the event of adjustment of the second defined position of the transmission lever which corresponds to the closing of the valve.

In another embodiment, the adjustment of the second defined position allows to be performed with particular ease by applying pressure to the brake pressure control unit. The use of pneumatic pressure will be of special advantage in this context, as it will so be possible to employ the compressed air which is available in any case at the assembly bays.

In a version in which slight adaptations in length of the preassembled brake pressure control unit are required at the moment of final mounting in the vehicle, it is envisaged that the distance between the pivotal points of the spring device which are related to the transmission lever and to the vehicle is preadjusted by shifting the pivot end of the spring device relative to the pivotal point at the transmission lever. This process step renders it possible, in addition, to achieve an incorporation of the brake pressure control unit free of play during its mounting in the vehicle.

The fixation of the defined position of the preloaded spring device is rendered particularly easy in that the spring device is furnished with slidable stop means, in that one of the stop means is fastened to the spring device, in that a spacing element is brought to be abutted against the stationary stop means, and in that the slidable stop means is brought into abutment against the spacing element and is fastened to the spring device in that position. If upon final mounting, the spacing element should not have been removed by error, this will be without importance, since the length of the spring device becomes larger in operation than the fixed length. Owing to the adjustment of the freedom of play with the spring unit in preloaded condition, any unintentional tensioning of the spring device in the course of the adjusting procedure will be easily noticed due to the increase of force during adjustment and will, therefore, allow to be easily excluded.

A further embodiment of the process according to the present invention is of particular advantage in which in the event of fixation of the defined length of the spring device, the spring device is provided with slidable stop means, one of the stop means is fastened to the spring device, a spacing element with a first forked extension straddling a pertaining range at the stationary stop means and with a second forked extension straddling a pertaining range at the slidable stop means is arranged at the spring device and the slidable stop means is fastened in this position to the spring device, because any unintentional tensioning of the prestressed spring device during the adjusting procedure is safely excluded thanks to a positive locking in the fixed condition by means of the forked extensions of the spacing means.

Then, it is envisaged that fastening of the stop means configured in the shape of sleeves whose internal diameter is larger by the play of motion than the wire diameter of the spring device configured in the shape of a helical spring takes place by a pinching operation.

According to the invention, the further object is achieved in that at the brake pressure control unit, there is arranged a device for the adjustment of the change-over point which comprises a stop means that is formed at the spring device pivoted to the transmission lever, a second stop means that is fastened to the spring device at a distance from the first stop means, and a removable spacing means in the shape of a distance guage that is interposed between the stop means and by which a distance of the two stop means corresponding to a determined amount of preload of the spring comes to be adjusted.

The amount of preload of the spring which, starting from the spring force corresponding to the change-over pressure, comes about by the shift of the valve by the closing travel in the opening direction results to be adjusted by the arrangement of the two stop; means. After the spring device has been coupled free of play to the relevant vehicle member, exactly that amount of spring force will, thus, always be obtained on each shift by the closing travel which corresponds to the desired spring force at the change-over point.

Still another embodiment of the invention is of particular advantage in which it is envisaged that the spacing means configurated as a distance guage is formed with fork-shaped extensions and that it straddles ranges at the stop means with the stems of these extensions. An unintentional tensioning of the spring device during the adjusting procedures is safely excluded thanks to a positive locking of the spring device in the fixed condition.

According to the invention it is, then, envisaged that the stems of one extension engage in a groove which is provided at the stop means of a sleeve-shaped configuration. In a further simple-design version, the stems of one extension are related to front surfaces of the stop means.

In a further embodiment, a spring device configurated in the shape of a helical spring is envisaged.

Particular advantages are offered by a brake pressure control unit in which an adjusting device is provided that is intended to adjust the distance of the pivotal points of the spring device which are related to the transmission lever and to the vehicle.

Owed to the use of standardized components, another version is especially advantageous in which the adjusting device is arranged at the end of the spring device related to the transmission lever and is configured in the shape of a threaded arrangement which comprises the end of the spring device configurated as a threaded end and, furthermore, threaded nuts which are abutable against the transmission lever and one of which threaded nuts serves as an out-of-adjustment protection, and in which portions of the adjusting device are configurated as stop means.

BRIEF DESCRIPTION OF THE DRAWING

The invention is described in more detail in the following with reference to embodiments illustrated in the drawing, in which.

DETAILED DESCRIPTION

Figure 1:
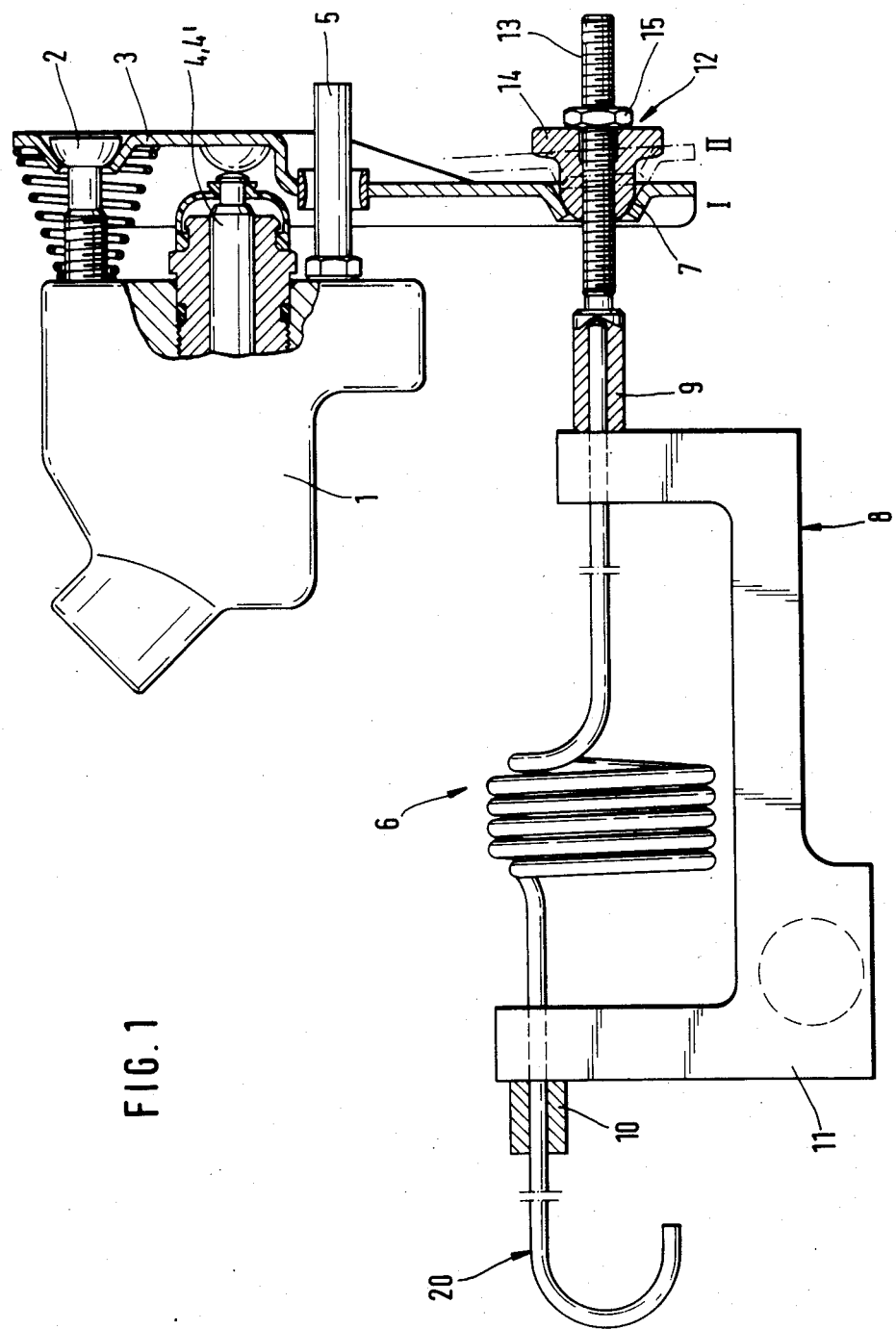
FIG. 1 shows a brake pressure control unit according to the invention.

The load-sensitively controlled brake pressure control unit is essentially comprised of a casing 1, a transmission lever 3 which is swivelingly supported at its one end by a ball pin 2, and two valves which are arranged in bores of the casing 1 and of which only the end of the control piston 4 of one of the valves projecting from the casing 1 is illustrated in the drawing in an offset part-section.

Each valve pertains to a pressure medium inlet port being in connection with a brake pressure source and to a pressure medium outlet port leading to wheel brake cylinders at the brakes of the rear wheels.

The ends of both control pistons 4, 4' are abutted with part-spherical-shaped buckles of the transmission lever 3. In the course of brake pressure build-up, starting from the open position of the valves in which the valve closing organs are positioned so as to be lifted off from the valve seats, the control pistons 4, 4' are, at a determined brake pressure, pushed out of the casing 1 in axial direction and for the first time into the closing position under effect of the pressure medium against a counteracting control force. The said first closure takes place at the so-called change-over pressure which defines the change-over point. The control force is generated by a spring device 6 and is transmitted to the ends of the control pistons by means of the transmission lever 3. In a brake pressure control unit designed, for example, as a pressure reducer, in the event of a pressure increase at the pressure medium inlet port upon the first closure of the valves, a pressure increase being reduced proportional to the pressure-chargeable effective areas of the control piston 4, 4' will take place at the pressure medium outlet port.

The plane of the swiveling motion of the transmission lever 3 around the ball pin 2 is defined by a guide stud 5. In addition to the swiveling motion, the transmission lever 3 is capable of performing a tipping motion about the ball pin 2, by which tipping motion the uniform distribution of the control force to the ends of the control pistons 4, 4' is ensured.

The end of the transmission lever 3 which is not related to the ball pin 2 is furnished with a spring pivotal point 7 configurated as a spherical cap-shaped depression provided with an opening and serving to pivot the spring device 6.

The spring device 6 arranged at the transmission lever 3 configurated in the shape of a helical spring and is provided with a threaded arrangement 12 at the end related to the transmission lever 3, whereas the other end 20 is bent over for suspension at a vehicle member. The spring device 6 is furnished with a device 8 by means of which a determined amount of spring preload of the helical spring is fixable. The device 8 is provided with a first stop means 9 which is formed at the end of the helical spring related to the transmission lever 3, with a second, sleeve shaped stop means 10 which is fastened at the other end of the helical spring, and with a spacing element 11 in the shape of a distance gauge which is interposed between the stop means 9, 10 and is removed after mounting of the brake pressure control unit in the vehicle and after adjustment of the freedom of play.

For the adjustment of the freedom of play just as well as for the adjustment of the distance of the pivotal points of the spring device 6, there is provided an adjusting device in the shape of a threaded arrangement 12 at the end of the spring device 6 facing the transmission lever 3, said adjusting device forming at the same time the first stop means 9. The adjusting device consists of a threaded end 13 in the shape of a threaded spindle formed at the spring device 6 and of threaded nuts 14, 15, of which the threaded nut 14 related to the spherical cap-shaped depression is furnished with a part-spherical-shaped abutment range. The threaded spindle is provided with a hollow bore into which one end of the helical spring is inserted and secured therein. The front surface of the threaded spindle provided with the hollow bore forms part of the first stop means 9.

With the brake pressure control unit not mounted in the vehicle, initially a first defined position I of the transmission lever 3 and of the spring pivotal point 7 is adjusted preferably by pushing the ball pin 2 more or less into the casing 1 while the transmission lever 3 is in abutment against the ends of the control pistons. The adjustment of the said first defined position I may, for example, be checked measuring the distance between a point of the transmission lever 3 and a point at the casing 1 of the brake pressure control unit.

Now the first stop means 9 and the second, sleeve-shaped stop means 10 are pushed onto the spring device 6. The first stop means 9, which with its hollow bore surrounds the end of the helical spring, is firmly secured to the spring device 6 by a pinching operation. The threaded end 13 is pushed through the opening in the spherical cap-shaped depression of the transmission lever 3 and the threaded nuts 14, 15 screwed onto the threaded spindle 13 until they reach a certain distance from the end of the threaded spindle 13. The other, bent-over end 20 of the spring device 6 is loaded with a determined force which is being kept constant, as a result whereof the helical spring is being extended.

The transmission lever 3 together with the spring pivotal point 7 is now brought into the position II, in which the valves are closed. This may preferably be made by applying pneumatic pressure such as from an outside source to the portion of the brake pressure control unit controlled by the valves. By means of a flow measurement, it is possible to ascertain that the closing position has been reached when flow of pneumatic pressure through the valve has ceased. Upon the pneumatic pressure build-up and on reaching of the position II of the pivotal point 7 on the part of the transmission lever 3, the bent end 20 of the helical spring is locked. With the bent end 20 in locked condition, the pneumatic pressure is relieved. Under the effect of the force exerted by the spring device 6, the transmission lever 3 returns into the position in which the pivotal point 7 assumes the first position I. The spacing element 11 is introduced between the stop means 9, 10 and is brought in abutment against the first stop means 9 by abutting and sliding the second stop means 10. With the spacing element 11 positioned free of play and free of force, the second stop means 10 is then secured to the spring device 6 by a pinching operation. The brake pressure control unit is installed in this state in the unloaded vehicle. For this purpose, the casing 1 of the brake pressure control unit is, for example, fastened to a first vehicle member and the bent-over end 20 of the spring device 6 pivoted, for example by suspending it into an ear or eye, to a second vehicle member which is movable load-sensitively with respect to the first vehicle member.

The spacing element 11 is removed after adjustment of the freedom of play with the aid of the threaded arrangement 12 and after locking of the threaded connection by means of the threaded nut 15. The brake pressure control unit is now ready for operation.

Figure 2:
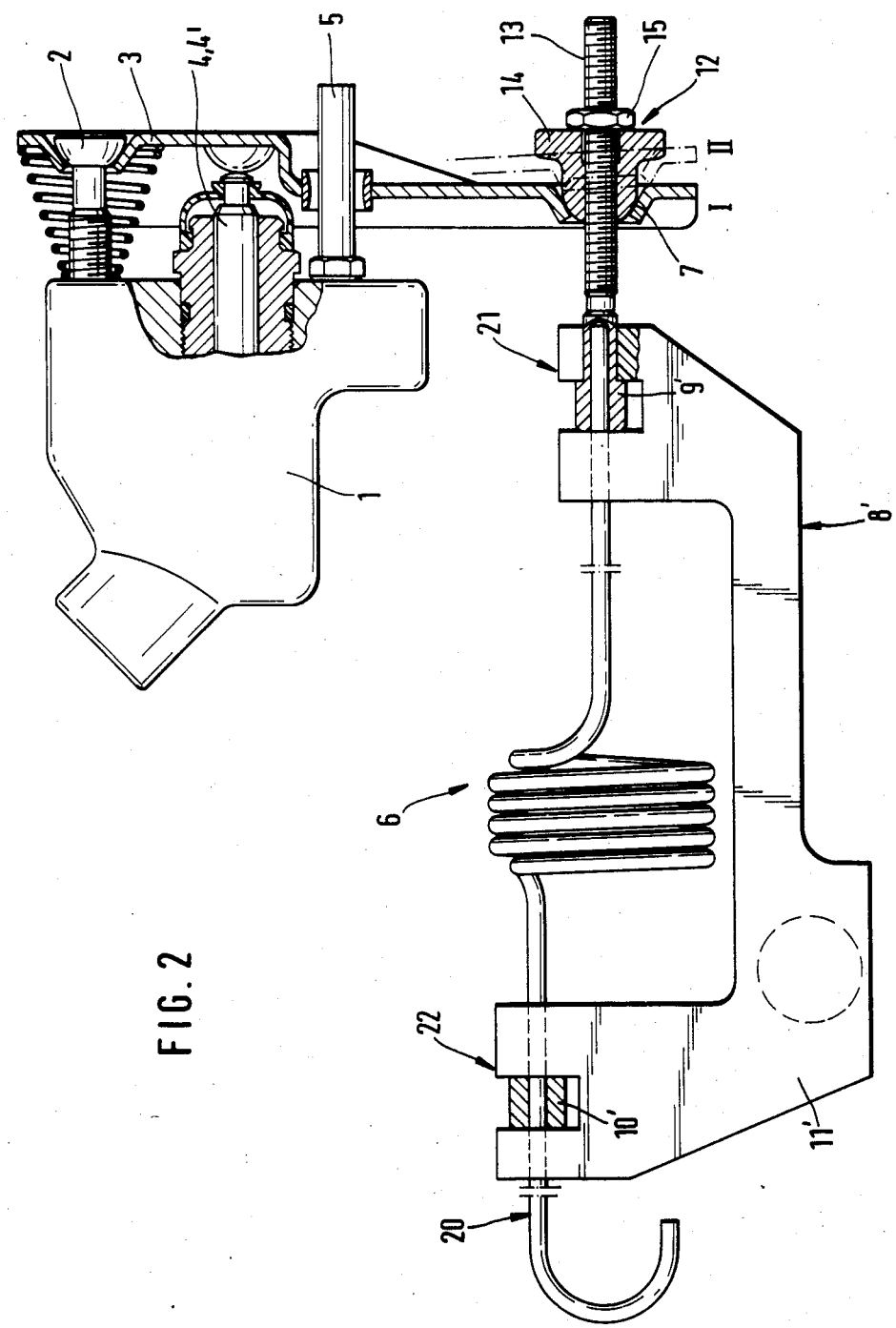
FIG. 2 a further inventive brake pressure control unit.

The brake pressure control unit illustrated in FIG. 2 corresponds in essence to the brake pressure control unit according to FIG. 1. Analogous members are given identical reference numerals.

The first stop means 9' of the device 8' is formed with a step at the circumference of the portion furnished with a hollow bore, the section with the smaller diameter facing the threaded end. The step and the front surface facing away from the threaded end constitute stop faces for the spacing element 11'.

The spacing element 11' is configured with two forked extensions 21 and 22. The stop means 9' and 10' are slidable into the gap between the stems of the forked extensions 21 and 22. The inner sides of the stems of the forked extension 21 are related to the one front surface and to the step of the stop means 9', whereas the inner sides of the stems of the forked extension 22 are related to the two front surfaces of the stop means 10.

During assembly, the first stop means 9' and the second, sleeve-shaped stop means 10 are pushed onto the spring device 6. The first stop means 9', which with its hollow bore surrounds the end of the helical spring, is firmly secured to the spring device 6 by a pinching operation. The threaded end 13 is pushed through the opening in the spherical cap-shaped depression of the transmission lever 3 and the threaded nuts 14, 15 screwed onto the threaded spindle 13 until they reach a certain distance from the end of the threaded spindle 13. The other, bent-over end of the spring device 6 is loaded with a determined force which is being kept constant, as a result whereof the helical spring is being extended.

The transmission lever 3 together with the spring pivotal point 7 is now brought into the position II, in which the valves are closed. This may preferably be made by applying pneumatic pressure such as from an outside source to the portion of the brake pressure control unit controlled by the values. By means of a flow measurement, it is possible to ascertain that the closing position has been reached when the flow of the pneumatic pressure through the valve has ceased. Upon the pneumatic pressure build-up and on reaching of the position II of the pivotal point 7 on the part of the transmission lever 3, the bent end 20 of the helical spring is locked. With the bent end 20 in locked condition, the pneumatic pressure is relieved. Under the effect of the force exerted by the spring device 6, the transmission lever 3 returns to the position in which the pivotal point 7 assumes the first position I.

The spacing element 11 is arranged at the spring device 6 in such a manner that the stop means 9', 10' with the pertaining stop faces (front surfaces in the case of the stop means 10', one front surface and the step in the case of the stop means 9) are positioned free of play and force between the stems of the forked extensions 21, 22. The second stop means 10' is then secured to the spring device 6 by a pinching operation.

The brake pressure control unit is installed in this state in the unloaded vehicle. For this purpose, the casing 1 of the brake pressure control unit is, for example, fastened to a first vehicle member and the bent-over end 20 of the spring device 6 pivoted, for example by suspending it into an ear or eye, to a second vehicle member which is movable load-sensitively with respect to the first vehicle member.

The spacing element 11' is removed after adjustment of the freedom of play with the aid of the threaded arrangement 12 and after locking of the threaded connection by means of the threaded nut 15. The brake pressure control unit is now ready for operation.

What is claimed is:

1. A brake pressure control unit for a pressure medium-actuable vehicle brake unit, which brake pressure control unit is load-sensitively controllable by an adjustable spring device and is equipped with at least one valve having a control piston pressure-sensitively slidable into a closing position against the force of the spring device, said spring device pivotally connected to a swivelling transmission lever, means for the preadjustment of the change-over point where pressure control is initiated by said brake pressure control unit, said preadjustment means comprising first stop means formed on said spring device and pivotally connected to said transmission lever, second stop means fastened to said spring device at a distance from said first stop means, and a removable spacing means in the shape of a distance gauge interposed between the said stop means and by which a distance of the said two stop means corresponding to a determined amount of preload of the spring is adjusted.

2. The brake pressure control unit of claim 1, wherein said spacing means which is arranged as a distance gauge is formed with fork-shaped extensions which straddle said stop means when said spacing means is interposed between said stop means.

3. The brake pressure control unit of claim 2, wherein said extension comprise opposed facing stems, whereby said stems of one of said extensions engage a groove provided at said stop means, said stop means comprising a sleeve-shaped configuration.

4. The brake pressure control unit of claim 2, wherein said stems of one of said extensions are related to front surfaces of said stop means.

5. The brake pressure control unit of claim 2, wherein said spring device is configured in the shape of a helical spring.

6. The brake pressure control unit of claim 1, including an adjusting device for adjusting the distance of the pivotal points of said spring device which are operatively connected to said transmission lever and to the vehicle.

7. The brake pressure control unit of claim 6, wherein said adjusting device is disposed at the end of said spring device operatively connected to said transmission lever and includes a threaded end of said spring device and wherein a plurality of threaded nuts are abutable against said transmission lever, one of said threaded nuts serving as a locking means for out-of-adjustment protection, and wherein portions of said adjusting device are configured as stop means.

8. A process for the preadjustment of the change-over point of a brake pressure control unit of a pressure medium-actuatable vehicle brake unit, which said brake pressure control unit is load-sensitively controlled by an adjustable spring device and is equipped with at least one valve with a control piston being pressure-sensitively slidable into closing position against the force of the spring device, said spring device being pivotably connected to a swiveling transmission lever, in which the transmission lever is moved between two defined positions, a first position being defined by the closing position of the valve and a second position defined by the opening position of the valve, said process comprising the steps of: pivoting said spring device; applying a defined force to the free end of said spring device to prestress said spring device, stationarily fixing said free end of said spring device relative to said transmission lever while said transmission lever is in said first position to close said valve, bringing said transmission lever to said second position to open said valve, and fixing the length of said prestressed spring device.

9. The process of claim 8, including the additional step of adjusting the second position of said transmission lever which corresponds to an open position of said valve of shifting a bearing point where said transmission lever is swivelably connected to said brake pressure control unit, said shifting of said bearing point occurring while said transmission lever is in abutment against said control piston.

10. The process of claim 9, including the additional step of adjusting the first position of said transmission lever which corresponds to the closed position of the valve by measuring the flow of pressure medium through said valve.

11. The process of claim 10, wherein the step of adjusting said first position of said transmission lever includes the sub-step of applying pressure to the brake pressure control unit.

12. The process of claim 11 wherein the step of adjusting said first position of said transmission lever includes the step of applying pneumatic pressure to the brake pressure control unit.

13. The process of claim 12, wherein the distance between the pivotal points of the said spring device which are pivotally connected to said transmission lever and to the vehicle is adjusted by the step of shifting the pivot end of said spring device relative to the pivotal point at said transmission lever.

14. The process of claim 8, wherein the step of fixing the length of said spring device, includes furnishing said spring device with slidable stop means, by fastening a first of said stop means to said spring device and abutting a spacing element against said first stop means, and bringing said second stop means into abutment against said spacing element and fastening said second stop means to said spring device in a position determined by said spacing element.

15. The process of claim 14, wherein the step of fixing the length of said spring device includes providing said spring device with slidable stop means by fastening a first and said stop means to said spring device, straddling said first stop means with a first forked extension of said spacing element, straddling a second of said stop means with a second forked extension of said spacing element spaced a predetermined distance from said first forked extension, and fastening said second stop means to said spring device a predetermined distance from said first stop means.

16. The process of claim 15, including the step of providing said stop means in the shape of sleeves whose internal diameter is larger by the play of motion than the diameter of said spring device by a pinching operation and providing said spring device in the shape of a helical spring.

17. A process for the adjustment of the change-over point of a brake pressure control unit of a pressure medium-actuatable vehicle brake unit, which said brake pressure control unit is load-sensitively controlled by an adjustable spring device and is equipped with at least one valve with a control piston being pressure-sensitively slidable into closing position against the force of the spring device, said spring device being pivotably connected to a swiveling transmission lever, in which the transmission lever is moved between two defined positions, a first position being defined by the closing position of the valve and a second position being defined by the opening position of the valve, said process comprising the steps of: pivoting said spring device, applying a defined force to the free end of said spring device to prestress said spring device, stationarily fixing said free end of said spring device relative to said transmission lever while said transmission lever is in said first position to close said valve, bringing said transmission lever to said second position to open said valve, fixing the length of said prestressed spring device, mounting said brake pressure control unit in said vehicle by fastening said unit to a first vehicle element, pivotally attaching said free end of said spring device to a second vehicle element, which said second vehicle element is movable with respect to said first vehicle element depending on load, adjusting the freedom of play in said spring device, on cancelling the fixation of said spring device.

* * * * *